(12) United States Patent
Qiu et al.

(10) Patent No.: US 12,237,550 B2
(45) Date of Patent: Feb. 25, 2025

(54) FUEL CELL SYSTEM HAVING MAXIMUM CELL VOLTAGE CONSTRAINT

(71) Applicant: Ford Global Technologies, LLC, Dearborn, MI (US)

(72) Inventors: Zeng Qiu, Grosse Pointe Woods, MI (US); Rajit Johri, San Francisco, CA (US); William F. Sanderson, Jr., Commerce Township, MI (US); Hao Wang, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 234 days.

(21) Appl. No.: 17/668,416

(22) Filed: Feb. 10, 2022

(65) Prior Publication Data

US 2023/0253588 A1 Aug. 10, 2023

(51) Int. Cl.
*H01M 8/04858* (2016.01)
*B60L 50/75* (2019.01)
*B60L 58/40* (2019.01)
*H01M 8/04537* (2016.01)

(52) U.S. Cl.
CPC ........... *H01M 8/0491* (2013.01); *B60L 50/75* (2019.02); *B60L 58/40* (2019.02); *H01M 8/04559* (2013.01); *H01M 2250/20* (2013.01)

(58) Field of Classification Search
CPC ...... H01M 2250/20; B60L 50/75; B60L 58/40
See application file for complete search history.

(56) References Cited

U.S. PATENT DOCUMENTS

| | | | |
|---|---|---|---|
| 7,807,306 B2 | 10/2010 | Kilian et al. | |
| 9,590,259 B2 | 3/2017 | Toida | |
| 10,266,067 B2 | 4/2019 | Kwon | |
| 2004/0083039 A1* | 4/2004 | Hunt | B60L 58/33 180/65.265 |
| 2005/0244688 A1 | 11/2005 | Suzuki | |
| 2012/0225329 A1* | 9/2012 | Kazuno | H01M 8/04604 429/432 |
| 2015/0288007 A1 | 10/2015 | Gangwar et al. | |

* cited by examiner

*Primary Examiner* — Adam A Arciero
(74) *Attorney, Agent, or Firm* — David B. Kelley; Brooks Kushman P.C.

(57) ABSTRACT

A system, such as for a fuel cell electric vehicle, includes a fuel cell stack (FCS) and a controller. The FCS is configured to provide, such as for vehicle propulsion, a stack power commensurate with a stack power request. The stack power is a product of a stack current of the FCS and a stack voltage of the FCS. The controller is configured to, upon the stack voltage meeting a predetermined threshold, control the FCS to increase the stack current to cause the FCS to provide an increased stack power commensurate with an increased stack power request.

12 Claims, 4 Drawing Sheets

FUEL CELL SYSTEM HAVING MAXIMUM CELL VOLTAGE CONSTRAINT

TECHNICAL FIELD

The present invention relates to methods and systems for controlling a fuel cell system.

BACKGROUND

A fuel cell is an electrochemical device that converts chemical energy of a fuel, e.g., hydrogen, and an oxidizing agent, e.g., oxygen, into electrical energy, with water as a byproduct. A fuel cell stack is a series connection of fuel cells. A fuel cell system includes one or more fuel cell stacks. The fuel cell system may be used in a vehicle to provide electrical energy for vehicle propulsion.

SUMMARY

A system includes a fuel cell stack (FCS) and a controller. The FCS is configured to provide a stack power commensurate with a stack power request, the stack power being a product of a stack current of the FCS and a stack voltage of the FCS. The controller is configured to, upon the stack voltage meeting a predetermined threshold, control the FCS to increase the stack current to cause the FCS to provide an increased stack power commensurate with an increased stack power request.

A characteristic of the FCS is that the stack voltage inversely depends on the stack current, whereby the stack voltage is decreased less than the predetermined threshold upon the controller controlling the FCS to increase the stack current.

The FCS is comprised of a number of fuel cells connected in series and the stack voltage is a summation of voltages of the fuel cells. In an embodiment, the voltages of the fuel cells are directly measured, and a maximum cell voltage is the largest measured voltage. In another embodiment, the maximum cell voltage is the stack voltage divided by the number of fuel cells. In either case, the stack voltage is considered to meet the predetermined threshold upon the maximum cell voltage meeting a predetermined maximum voltage. Further, a characteristic of each fuel cell is that the voltage of the fuel cell inversely depends on the stack current, whereby the voltages of the fuel cells are decreased less than the predetermined maximum voltage upon the controller controlling the FCS to increase the stack current.

The controller may be further configured to, upon the stack power commensurate with the stack power request being lower than a calculated minimum power, control the FCS to increase the stack current to cause the FCS to provide the increased stack power commensurate with the increased stack power request.

The controller may be further configured to set the calculated minimum power dependent on an operating condition of the FCS. The controller may use a gradient calculation in setting the calculated minimum power.

The controller may be further configured to, while the stack voltage is less than the predetermined threshold, control the FCS to cause the FCS to provide the stack power commensurate with the stack power request.

Stack power provided by the FCS may be for use in propelling a vehicle.

A vehicle includes a fuel cell system (FCS) and a controller. The FCS is configured to provide a stack power for vehicle propulsion, the stack power being a product of a stack current and a stack voltage of the FCS. The controller is configured to, in response to a stack power request, adjust the stack current to a desired amount corresponding to the stack power request to cause the FCS to provide a stack power commensurate with the stack power request. The controller is further configured to, upon the stack voltage meeting a predetermined threshold, increase the stack power request to an increased stack power request and adjust the stack current to an increased desired amount corresponding to the increased stack power request to cause the FCS to provide an increased stack power commensurate with the increased stack power request.

The controller may be further configured to, upon a stack power commensurate with a stack power request being lower than a calculated minimum power, increase the stack power request to the increased stack power request and adjust the stack current to the increased desired amount corresponding to the increased stack power request to cause the FCS to provide the increased stack power commensurate with the increased stack power request.

A method for use with a fuel cell stack (FCS) configured to provide a stack power, the stack power being a product of a stack current and a stack voltage of the FCS, includes the following steps. The method includes, in response to a stack power request, adjusting the stack current to a desired amount corresponding to the stack power request to cause the FCS to provide a stack power commensurate with the stack power request. The method further includes, upon either the stack voltage meeting a predetermined threshold or the stack power being lower than a calculated minimum power, increasing the stack power request to an increased stack power request and adjusting the stack current to an increased desired amount corresponding to the increased stack power request to cause the FCS to provide an increased stack power commensurate with the increased stack power request.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
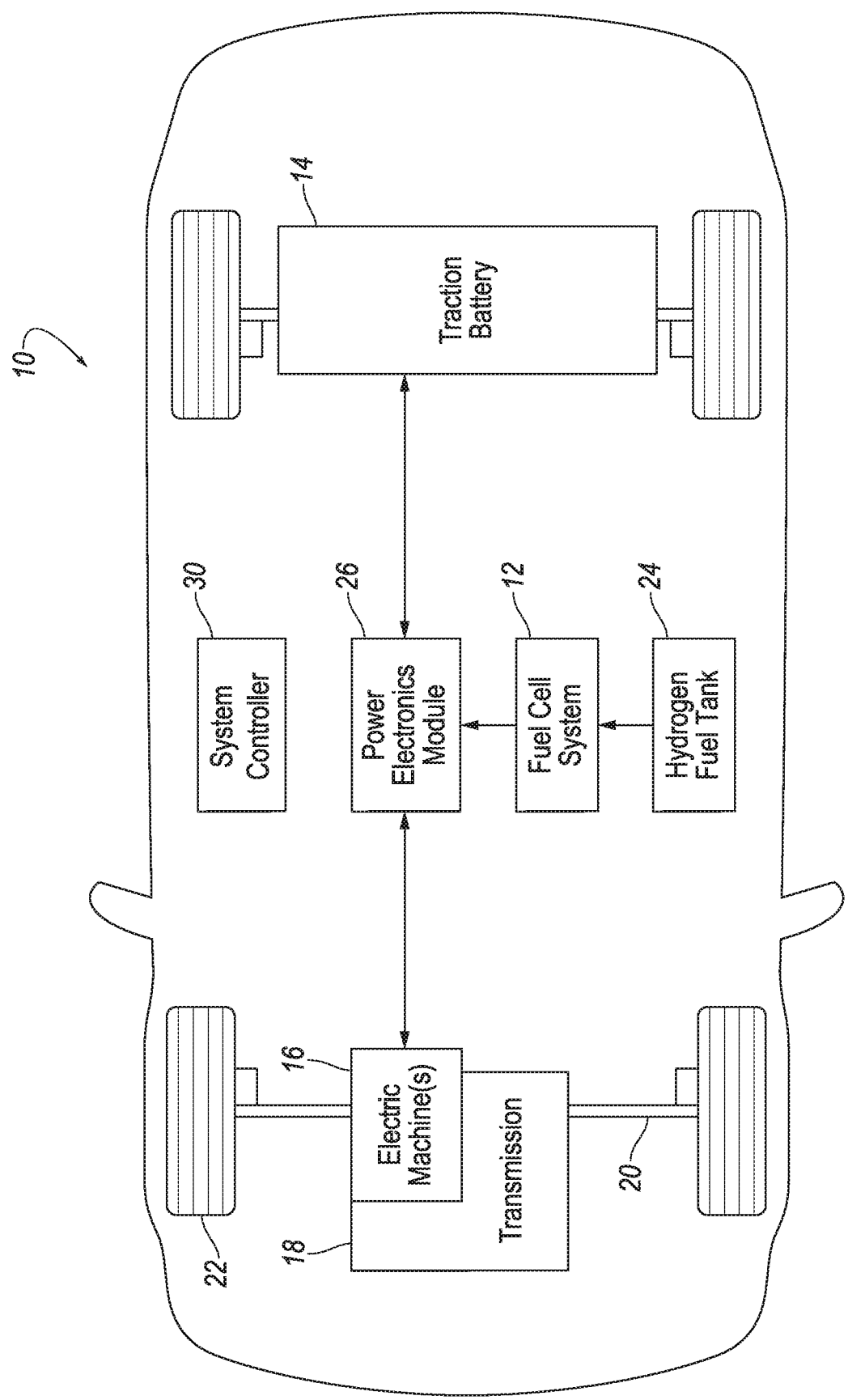
FIG. 1 illustrates a block diagram of an exemplary fuel cell electric vehicle having a fuel cell system ("FCS") and a traction battery both for providing electrical energy for vehicle propulsion, the FCS having a fuel cell stack comprised of fuel cells connected in series.

Referring now to FIG. 1, a block diagram of an exemplary fuel cell electric vehicle ("FCEV") 10 having a fuel cell system ("FCS") 12 and a traction battery ("battery") 14 is shown. FCS 12 and traction battery 14 are individually operable for providing electrical energy for propulsion of FCEV 10.

FCS 12 includes one or more fuel cell stacks (not shown). Each fuel cell stack (also "FSC" where noted) is comprised of a plurality of fuel cells electrically connected in series (not shown). For simplicity, FCS 12 is described herein as having one fuel cell stack. FCS 12 further includes auxiliary equipment such as an electric compressor for FCS air supply.

FCEV 10 further includes one or more electric machines 16 mechanically connected to a transmission 18. Electric machine 16 is capable of operating as a motor and as a generator. Transmission 18 is mechanically connected to a drive shaft 20 mechanically connected to wheels 22 of FCEV 10. Electric machine 16 can provide propulsion and slowing capability for FCEV 10. Electric machine 16 acting as a generator can recover energy that may normally be lost as heat in a friction braking system.

FCS 12 is configured to convert hydrogen from a hydrogen fuel tank 24 of FCEV 10 into electrical energy. The electrical energy from FCS 12 is for use by electric machine 16 for propelling FCEV 10. FCS 12 is electrically connected to electric machine 16 via a power electronics module 26 of FCEV 10. Power electronics module 26, having an inverter or the like, provides the ability to transfer electrical energy from FCS 12 to electric machine 16. For example, FCS 12 provides direct current (DC) electrical energy while electric machine 16 may require three-phase alternating current (AC) electrical energy to function. Power electronics module 26 converts the electrical energy from FCS 12 into electrical energy having a form compatible for operating electric machine 16. In this way, FCEV 10 is configured to be propelled with use of electrical energy from FCS 12.

Battery 14 stores electrical energy for use by electric machine 16 for propelling FCEV 10. Battery 14 is also electrically connected to electric machine 16 via power electronics module 26. Power electronics module 26 provides the ability to bi-directionally transfer electrical energy between battery 14 and electric machine 16. For example, battery 14 may also provide DC electrical energy while electric machine 16 may require the three-phase AC electrical energy to function. Power electronics module 26 converts the electrical energy from battery 14 into electrical energy having the form compatible for operating electric machine 16. In this way, FCEV 10 is further configured to be propelled with the use of battery 14. Further, in a regenerative mode, power electronics module 26 converts AC electrical energy from electric machine 16 acting as a generator to the DC electrical energy form compatible with battery 14.

FCS 12 and battery 14 may have one or more associated controllers to control and monitor the operation thereof. The controllers can be microprocessor-based devices. The controllers may communicate via a serial bus (e.g., Controller Area Network (CAN)) or via discrete conductors.

For example, a system controller 30 (i.e., a vehicle controller) is configured to coordinate the operation of FCS 12 and battery 14 and may be further configured to control the FCS and the battery accordingly. In operation for propelling FCEV 10, controller 30 interprets and splits a driver power demand into an FCS power request and a battery power request. In turn, FCS 12 is controlled to output electrical power commensurate with the FCS power request to electric machine 16 for use in propelling FCEV 10. Likewise, battery 14 is controlled to output electrical power commensurate with the battery power request to electric machine 16 for use in propelling FCEV 10.

As noted above, FCS 12 includes a fuel cell stack that is comprised of a series connection of fuel cells. The electrical voltage of a fuel cell depends inversely on the electrical current of the fuel cell. The voltage of the fuel cell further depends on other factors including cell temperature, membrane humidity, pressure, anode hydrogen concentration, air flow rate, and the like. Notably, of all of the factors, the voltage of the fuel cell is most sensitive and responsive to the current of the fuel cell.

As the fuel cells of a fuel cell stack are connected in series, the voltage of the fuel cell stack ("fuel cell stack voltage" or "stack voltage") is a summation of all of the voltages of the fuel cells of the fuel cell stack. Likewise, as the fuel cells of the fuel cell stack are connected in series, each fuel cell has the same current and the current of the fuel cell stack ("fuel cell stack current" or "stack current") is the same as the current of each of the fuel cells. The power delivered by the fuel cell stack ("fuel cell stack power" or "stack power") is equal to the stack voltage multiplied by the stack current, i.e., stack power=stack voltage*stack current.

Figure 2:
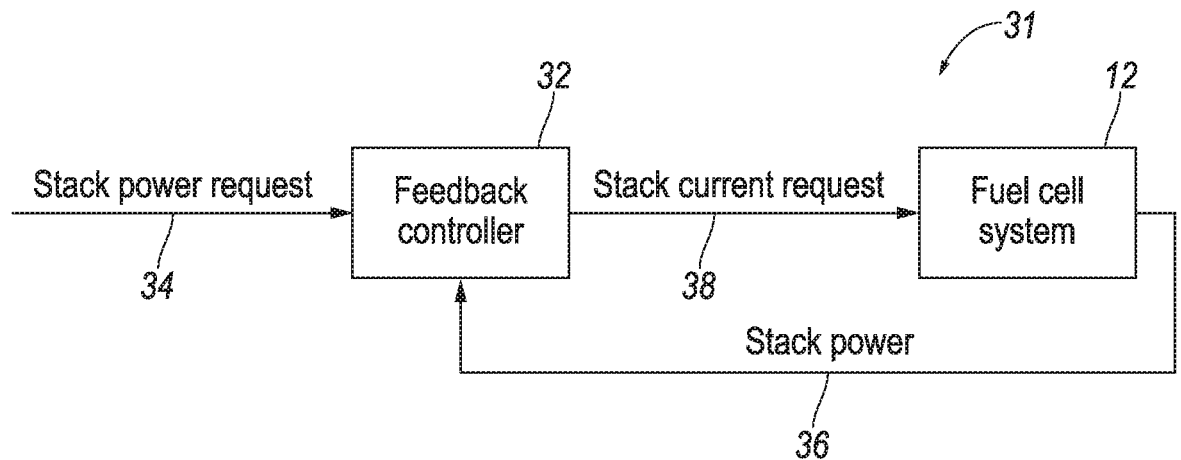
FIG. 2 illustrates a block diagram of a feedback control algorithm for the FCS to provide a fuel cell stack power commensurate with a fuel cell stack power request.

Referring now to FIG. 2, with continual reference to FIG. 1, a block diagram of a feedback control algorithm 31 for FCS 12 to provide a fuel cell stack power commensurate with a fuel cell stack power request (or "stack power request") is shown. Feedback control algorithm 31 is implemented by a controller 32 of FCS 12. In operation, in response to a stack power request 34, controller 32 feedback adjusts the stack current to a desired amount to cause FCS 12 to deliver the requested stack power to electric machine 16. Controller 32 generates a stack current request 38 for the desired amount of stack current according to a comparison of (i) the requested stack power (i.e., stack power request 34) and (ii) the actual stack power delivered by FCS 12, as indicated by a delivered stack power measurement signal 36. Delivered stack power measurement signal 36 is generated by a sensor (not shown) measuring the actual stack power delivered by FCS 12. Controller 32 controls FCS 12 according to stack current request 38 to thereby adjust the stack current to meet the stack current request whereby FCS 12 delivers the requested stack power.

In this exemplary embodiment in which FCS 12 has one fuel cell stack, the stack power request is the FCS power request generated by system controller 30 in response to a driver power demand, the stack current (i.e., the current of the fuel cell stack) is the current of the stack power delivered by the FCS, and the stack voltage (i.e., the voltage of the fuel cell stack) is the voltage of the stack power delivered by the FCS.

In operation, when the voltage of a fuel cell is above a certain threshold, the fuel cell may degrade relatively fast. Methods and systems in accordance with embodiments of the present invention, to prolong fuel cell stack life, impose an upper voltage limit $V_{lim}$ (i.e., a predetermined threshold) for the voltages of the fuel cells of the fuel cell stack of FCS 12. The methods and systems function to maintain the voltages of the fuel cells of the fuel cell stack less than the upper voltage limit $V_{lim}$.

As an example, in this exemplary embodiment, the upper voltage limit $V_{lim}$ is set to be 0.85 V. Of course, the upper voltage limit $V_{lim}$ could be set at any number of voltages.

Figure 3:
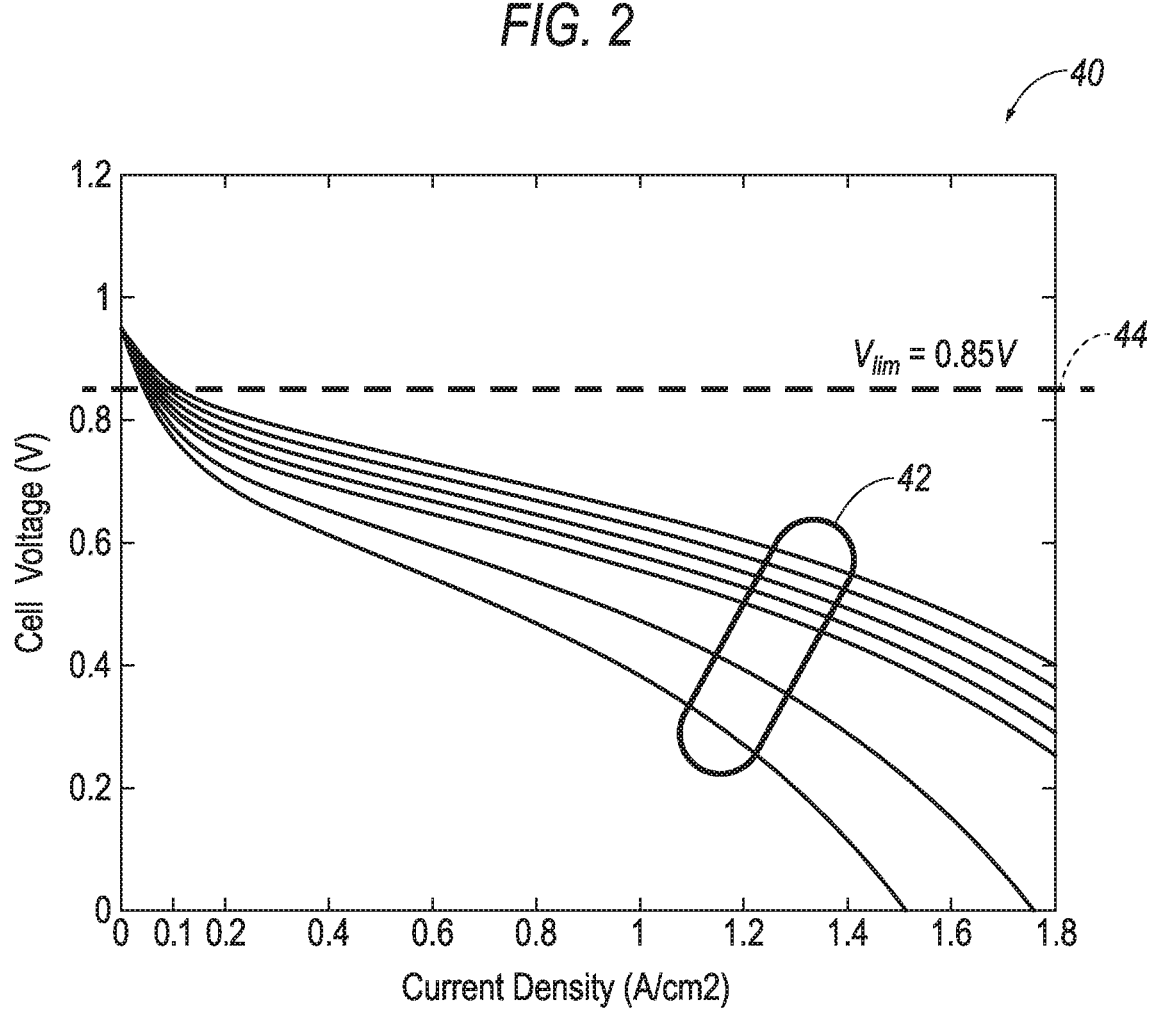
FIG. 3 illustrates a graph of a pole curve of a fuel cell of the fuel cell stack of the FCS, the graph being indicative of the electrical current vs. electrical voltage relationship of the fuel cell.

Referring now to FIG. 3, a graph 40 of a pole curve of a fuel cell of the fuel cell stack of FCS 12 is shown. Graph 40 is indicative of the current vs. voltage relationship of the fuel cell. The current density of the fuel cell is on the x-axis of graph 40 and the voltage of the fuel cell is on the y-axis of graph 40. As noted above, the voltage of the fuel cell depends inversely on the current of the fuel cell and is most sensitive and responsive to the current of the fuel cell. This relationship is confirmed by plots 42 of graph 40 which depict fuel cell voltages as being low at high fuel cell stack currents and being high at low fuel cell stack currents. Notably, graph 40 indicates that the fuel cell voltages are comfortably less than the 0.85 V upper voltage limit $V_{lim}$, marked by plot line 44, when the current density of the fuel cell is greater than 0.2 A/cm². Conversely, graph 40 indicates that the fuel cell voltages exceed the 0.85 V upper voltage limit Vin when the current density of the fuel cell is less than about 0.1 A/cm².

Further, plots 42 of graph 40 correspond to different operating conditions. For example, different operating conditions involve different temperature, humidity, pressure, hydrogen concentration, and/or air flow rate and/or the like. The current vs. voltage relationship of the fuel cell differs depending on the different operating conditions as indicated with plots 42 being different from one another. Nevertheless, the fuel cell voltages being comfortably less than the 0.85 V upper voltage limit $V_{lim}$ when the current density of the fuel cell is greater than 0.2 A/cm² and being greater than the 0.85 V upper voltage limit $V_{lim}$ when the current density of the fuel cell is less than about 0.1 A/cm² occurs with all of the different operating conditions corresponding to plots 42.

As set forth, the voltage of a fuel cell depends inversely on the current of the fuel cell. As further set forth, since the fuel cell stack of FCS 12 is a series connection of fuel cells, (i) the voltage of the fuel cell stack is a summation of all of the voltages of the fuel cells and (ii) the fuel cells have the same current and the stack current is the same current. Methods and systems in accordance with the embodiments of the present invention employ these principles in functioning to maintain the voltages of the fuel cells of the fuel cell stack under the upper voltage limit $V_{lim}$. Particularly, the methods and systems maintain the voltages of the fuel cells under the upper voltage limit $V_{lim}$ by controlling the stack current to thereby control the stack voltage (i.e., to thereby control the voltage of the fuel cell stack). For example, the methods and systems increase the stack current to thereby lower the stack voltage, and thereby lower the voltages of the fuel cells of the fuel cell stack, when the voltages of the fuel cells would otherwise exceed the upper voltage limit $V_{lim}$.

Figure 4:
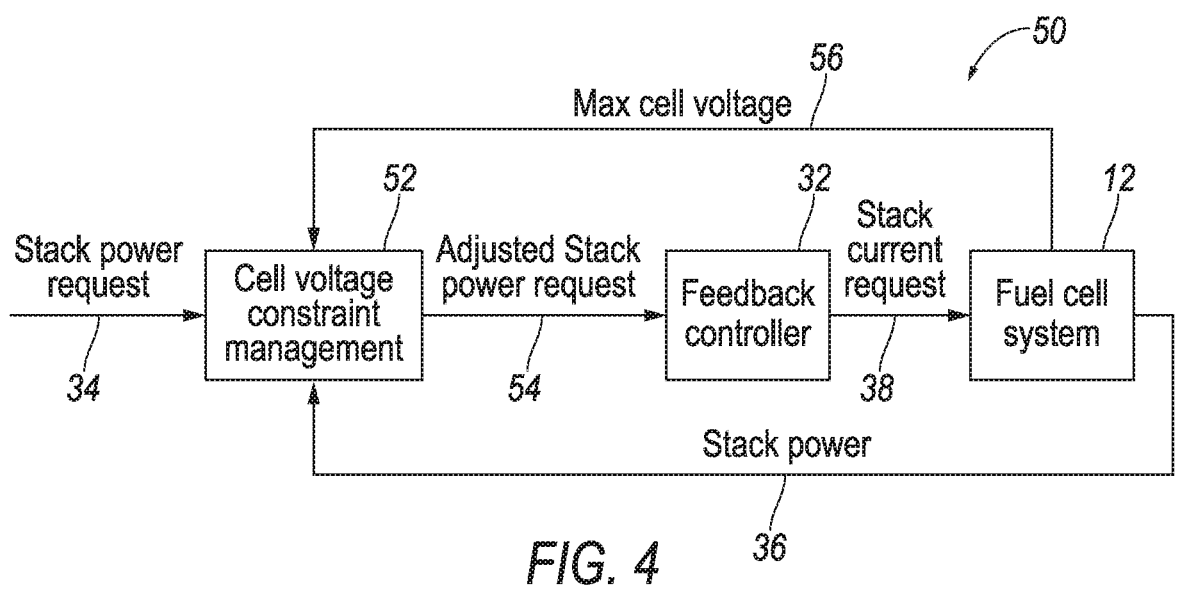
FIG. 4 illustrates a block diagram of another feedback control algorithm for the FCS to provide a fuel cell stack power commensurate with a fuel cell stack power request.

Referring now to FIG. 4, with continual reference to FIG. 2, a block diagram of another feedback control algorithm 50 for FCS 12 to provide a stack power commensurate with a stack power request is shown. Feedback control algorithm 50 is implemented by controller 32 of FCS 12. In operation of feedback control algorithm 50, just like with feedback control algorithm 31 shown in FIG. 2, controller 32 in response to a stack power request 34 feedback adjusts the stack current to a desired amount to cause FCS 12 to deliver the requested stack power.

However, unlike feedback control algorithm 31 shown in FIG. 2, feedback control algorithm 50 further includes a cell voltage constraint manager 52. Cell voltage constraint manager 52 is a processor unit implemented by controller 32. Cell voltage constraint manager 52 generates an adjusted stack power request 54 based on the requested stack power (i.e., stack power request 34) with consideration of a maximum cell voltage among the fuel cells of the fuel cell stack relative to the upper voltage limit $V_{lim}$. The maximum cell voltage among the fuel cells of the fuel cell stack is determinable from stack voltage (i.e., the voltage of the fuel cell stack) divided by the number of fuel cells of the fuel cell stack. This determination assumes that the fuel cells have relatively same voltages.

The voltage of the fuel cell stack is measured by a sensor (not shown) to generate a maximum cell voltage signal 56 indicative of the maximum cell voltage. This sensor provides maximum cell voltage signal 56 to cell voltage constraint manager 52. With consideration of maximum cell voltage signal 56, cell voltage constraint manager 52 generates adjusted stack power request 54 based on stack power request 34.

On the one hand, when the maximum cell voltage is less than the upper voltage limit $V_{lim}$, or perhaps when the maximum cell voltage is less than the upper voltage limit $V_{lim}$ by at least a predetermined margin (i.e., when the maximum cell voltage is at least somewhat far from violating the upper voltage limit $V_{lim}$), adjusted stack power request 54 generated by cell voltage constraint manager 52 is the same as stack power request 34. That is, cell voltage constraint manager 52 does not adjust stack power request 34 and simply outputs stack power request 34 as adjusted stack power request 54. In turn, as adjusted stack power request 54 is the same as stack power request 34, controller 32 generates stack current request 38 for a desired amount of stack current according to a comparison of (i) stack power request 34 and (ii) delivered stack power measurement signal 36. Controller 32 controls FCS 12 according to stack current request 38 to thereby adjust the stack current to meet the stack current request whereby FCS 12 delivers the requested stack power commensurate with stack power request 34.

On the other hand, when the maximum cell voltage matches or exceeds the upper voltage limit $V_{lim}$, or perhaps when the maximum cell voltage is less than but within the predetermined margin of the upper voltage limit $V_{lim}$ (i.e., when the maximum cell voltage is less than but relatively close to the upper voltage limit $V_{lim}$), adjusted stack power request 54 generated by cell voltage constraint manager 52 is different than stack power request 34. In particular, in this case, cell voltage constraint manager 52 increases stack power request 34 to generate adjusted stack power request 54. As a result, adjusted stack power request 54 compared with stack power request 34 is a request for relatively more stack power. In this way, cell voltage constraint manager 52 effectively increases stack power request 34 when the maximum cell voltage is relatively too high (i.e., when the maximum cell voltage matches or exceeds the upper voltage limit $V_{lim}$ or perhaps is at a chance of exceeding the upper voltage limit $V_{lim}$ in the near term).

In turn, controller 32 generates stack current request 38 for a desired amount of stack current according to a comparison of (i) adjusted stack power request 54 and (ii) delivered stack power measurement signal 36. Controller 32 controls FCS 12 according to stack current request 38 to thereby adjust the stack current to meet the stack current request whereby FCS 12 delivers the requested stack power commensurate with adjusted stack power request 54. As the delivered stack power is commensurate with adjusted stack power request 54, the delivered stack power is relatively more stack power than stack power commensurate with stack power request 34.

Notably, as adjusted stack power request 54 is a request for relatively more stack power than stack power request 34, stack current request 38 correspondingly is a request for relatively more stack current. As the voltages of the fuel cells inversely depend on the stack current whereby the stack voltage inversely depends on the stack current, as described herein, the increased stack current provided by FCS 12 in delivering the requested stack power commensurate with adjusted stack power request 54 causes the voltages of the fuel cells of the fuel cell stack to decrease which thereby decreases the stack voltage of the fuel cell stack.

Further, with reference to graph 40 of FIG. 2, at different operating conditions and throughout life of the fuel cell stack, the amount of stack current to keep the voltages of the fuel cells of the fuel cell stack at/below the upper voltage limit $V_{lim}$ is different. Therefore, the amount of stack power to keep the maximum cell voltage less than the upper voltage limit $V_{lim}$ varies. Accordingly, in embodiments of the present invention, cell voltage constraint management 52 implements an adaptation mechanism to find the minimum power limit $P_{lim}$. The adaption mechanism uses a gradient method to minimize $(V-V_{lim})^2$, where V is the maximum cell voltage and $V_{lim}$ is the upper voltage limit. The gradient method derives:

$$P_{lim}^{\cdot}=(\Gamma^{*}(V-V_{lim}))/I,$$

where $P_{lim}$ is the minimum power limit, $P_{lim}^{\cdot}$ is the derivative of the minimum power limit $P_{lim}$, $\Gamma$ is a calibratable parameter for adaptation gain, and I is the stack current.

Figure 5:
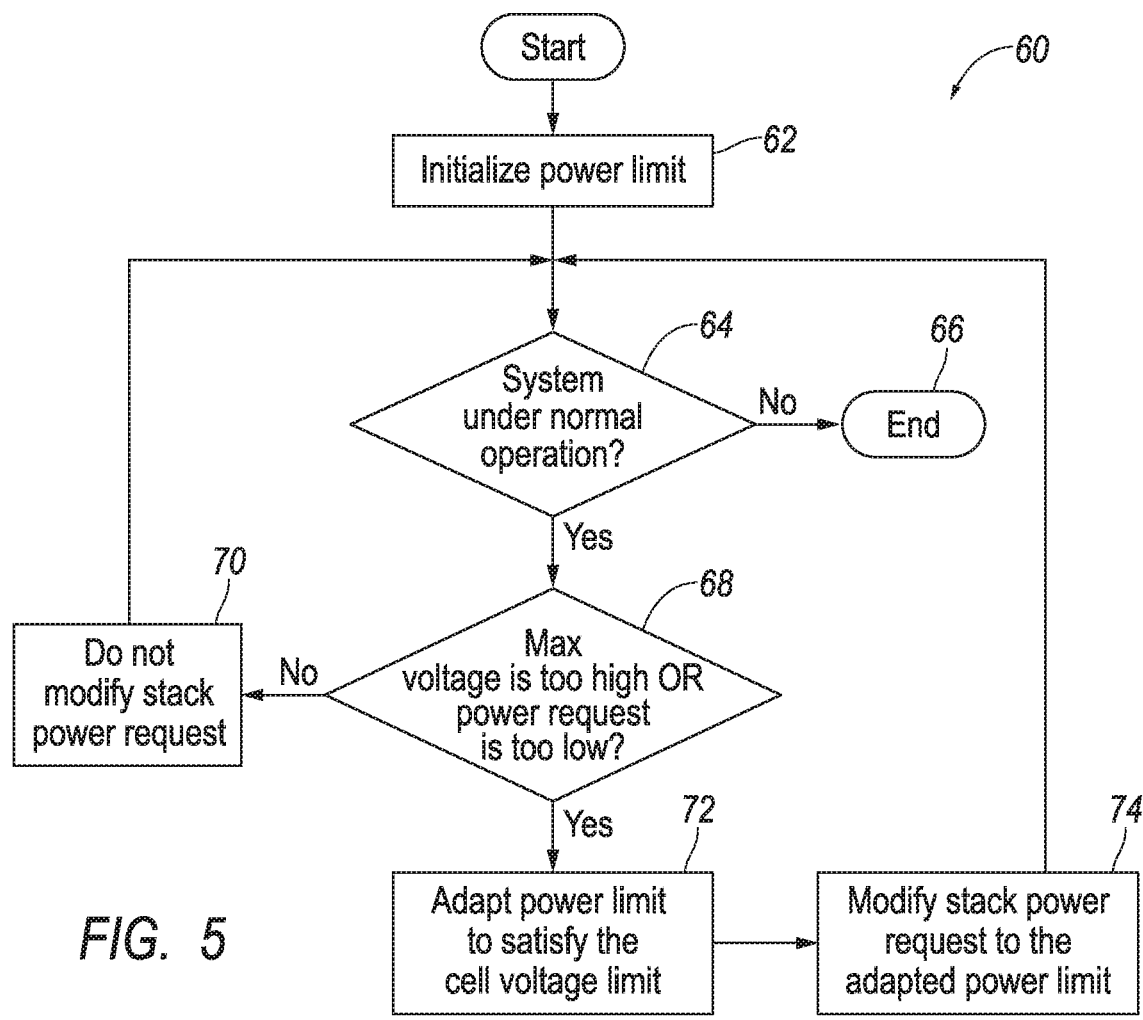
FIG. 5 illustrates a flowchart depicting operation of the feedback control algorithm shown in FIGS. 4.

Referring now to FIG. 5, with continual reference to FIG. 4, a flowchart 60 depicting operation of feedback control algorithm 50 is shown. As described, feedback control algorithm 50 provides a fuel cell voltage constraint management with stack power feedback control. The operation of feedback control algorithm 50 depicted in flowchart 60 provides for fuel cell voltage constrained management with adaptation. As noted, the operation of feedback control algorithm 50 is carried out by controller 32.

The operation of feedback control algorithm 50 begins with controller 32 initializing the minimum power limit $P_{lim}$, such as by use of the gradient method, as indicated in process block 62. Controller 32 then checks for normal system operation, as indicated in decision block 64. If the system operation is not normal, then the operation of feedback control algorithm 50 is terminated, as indicated in end block 66.

While system operation is normal, in response to receiving a stack power request 34, controller 32 checks as to (i) whether the maximum cell voltage is relatively high in relation to upper voltage limit $V_{lim}$ (i.e., whether the maximum cell voltage matches or exceeds the upper voltage limit $V_{lim}$ or perhaps whether the maximum cell voltage is less than but relatively close to the upper voltage limit $V_{lim}$) or (ii) whether the stack power requested is lower than a calculated power threshold, as indicated in decision block 68.

On the one hand, when the maximum cell voltage is not relatively high in relation to upper voltage limit $V_{lim}$ (i.e., when the maximum cell voltage is less than and perhaps relatively far from the upper voltage limit $V_{lim}$) and when the stack power requested is not lower than the calculated power threshold, cell voltage constraint management 52 does not adjust stack power request 34 in generating adjusted stack power request 54, as indicated in process block 70.

On the other hand, when the maximum cell voltage is relatively high in relation to upper voltage limit $V_{lim}$ or when the stack power requested is lower than the calculated power threshold, controller adapts the requested stack power to the minimum power limit $P_{lim}$, as indicated in process block 72. In turn, cell voltage constraint management 52 increases stack power request 34 to the adapted power limit $P_{lim}$ in generating adjusted stack power request 54, as indicated in process block 74.

Figure 6:
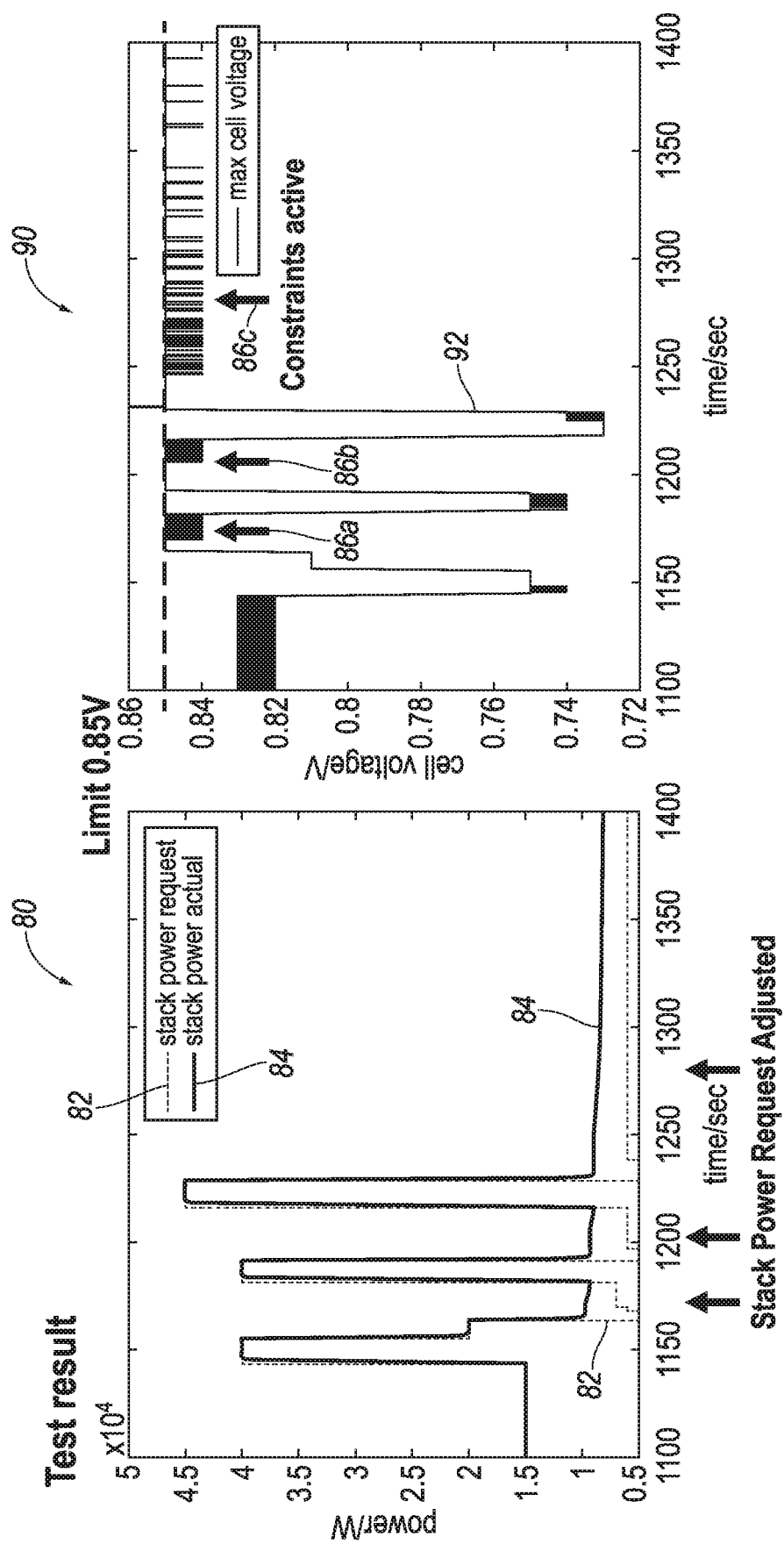
FIG. 6 illustrates a first graph having a plot of a fuel cell stack power request for the FCS and a plot of a fuel cell stack power delivered by the FCS over a time interval and a second graph having a plot of a maximum cell voltage of the fuel cells of the fuel cell stack over the same time interval.

Referring now to FIG. 6, with continual reference to FIGS. 4 and 5, a first graph 80 having a plot 82 of a fuel cell stack power request for FCS 12 and a plot 84 of a fuel cell stack power delivered by the FCS over a time interval and a second graph 90 having a plot 92 of a maximum cell voltage of the fuel cells of the fuel cell stack over the same time interval are shown. Graphs 80 and 90 provide a visual illustration of how feedback control algorithm 50 works. As indicated, graph 80 shows the stack power request (plot 82) and the actual power (plot 84) and graph 90 shows the maximum cell voltage (plot 92) among all the fuel cells of the fuel cell stack.

As shown by graph 80 in conjunction with graph 90, on the one hand, when the stack power request is relatively high, the maximum cell voltage is far from violating the voltage constraint (embodied by the 0.85 V upper voltage limit $V_{lim}$). Consequently, the stack power request is not adjusted.

On the other hand, when the stack power request is relatively low (e.g., at the three highlighted time slots 86a, 86b, and 86c) the maximum cell voltage matches the voltage constraint (i.e., the maximum cell voltage matching the 0.85 V upper voltage limit $V_{lim}$). Consequently, feedback control algorithm 50 adjusts the stack power request (i.e., the stack power request adjusted at the three highlighted time slots 86a, 86b, and 86c) to a higher level to keep the fuel cell voltages at the voltage constraint (i.e., the maximum cell voltage constraints are active at the three highlighted time slots 86a, 86b, and 86c).

That is, upon the maximum cell voltage matching the voltage constraint, controller 32 is triggered to increase the stack power request in generating the adjusted stack power request. As such, each time the maximum cell voltage matches the voltage constraint, controller 32 increases the stack power request. Controller 32 increases the stack power request so long as the maximum cell voltage matches the voltage constraint.

Likewise, upon the stack power request being lower than a calculated power threshold, controller 32 is triggered to increase the stack power request in generating the adjusted stack power request. As such, each time the stack power request becomes lower than the calculated power threshold, controller 32 increases the stack power request. Controller 32 increases the stack power request so long as the stack power request is lower than the calculated power threshold.

Lastly, for FCEV 10, vehicle power is the summation of FCS and battery power. The additional power that the FCS produces is consumed by the battery or the vehicle. When the battery is at a high state of charge and unable to absorb any additional power, the FCS will shut down (this is standard practice for hybrid battery vehicles). When the battery is at a lower state of charge, the battery will absorb the additional power from the FCS when needed.

As described, methods and systems in accordance with embodiments of the present invention provide a maximum cell voltage constraint management having a goal of making sure that the maximum cell voltage does not exceed a predetermined voltage limit to thereby provide longer fuel cell life. Ordinarily, the FCS will try to deliver exactly a fuel stack power request. In order to address the maximum cell voltage constraint, the fuel stack power request is modified when the maximum cell voltage constraint is violated. That is, when the maximum cell voltage matches or exceeds the predetermined voltage limit, the fuel stack power request is increased so that more stack current will be drawn which thereby reduces the stack voltage. The methods and systems may employ a gradient method to find a minimum stack power limit that will keep the cell voltage from exceeding the predetermined voltage limit.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A system comprising:
a fuel cell stack (FCS) configured to provide a stack power, the stack power being a product of a stack current and a stack voltage of the FCS, and the stack voltage inversely depending on the stack current; and
a controller configured to, in response to a stack power request, while the stack voltage is less than a predetermined threshold, adjust the stack current to a desired amount corresponding to the stack power request to cause the FCS to provide a stack power commensurate with the stack power request;
wherein the controller is further configured to, upon the stack voltage meeting or exceeding the predetermined threshold, increase the stack power request to an increased stack power request and adjust the stack current to an increased desired amount corresponding to the increased stack power request to cause the FCS to provide an increased stack power commensurate with the increased stack power request with the stack voltage, which inversely depends on the stack current, being decreased to be less than the predetermined threshold due to the stack current being increased to the increased desired amount, and the stack voltage being maintained to be less than the predetermined threshold due to the stack current being at the increased desired amount as the stack voltage inversely depends on the stack current.

2. The system of claim 1 wherein:
the FCS is comprised of a number of fuel cells connected in series, the stack voltage is a summation of voltages of the fuel cells, and a maximum cell voltage is either the largest voltage of the voltages of the fuel cells or the stack voltage divided by the number of fuel cells; and
the stack voltage is considered to be less than, meet, or exceed the predetermined threshold upon the maximum cell voltage being less than, meeting, or exceeding, respectively, a predetermined maximum voltage.

3. The system of claim 2 wherein:
the voltages of the fuel cells are decreased less than the predetermined maximum voltage while the stack voltage is maintained to be less than the predetermined threshold.

4. The system of claim 1 wherein:
the controller is further configured to, upon the stack power commensurate with the stack power request being lower than a calculated minimum power, control the FCS to increase the stack current to cause the FCS to provide the increased stack power commensurate with the increased stack power request.

5. The system of claim 4 wherein:
the controller is further configured to set the calculated minimum power dependent on an operating condition of the FCS.

6. The system of claim 5 wherein:
the controller is further configured to use a gradient calculation in setting the calculated minimum power.

7. A vehicle comprising:
a fuel cell system (FCS) configured to provide a stack power for vehicle propulsion, the stack power being a product of a stack current and a stack voltage of the FCS, and the stack voltage inversely depending on the stack current;
a controller configured to, in response to a stack power request, while the stack voltage is less than a predetermined threshold, adjust the stack current to a desired amount corresponding to the stack power request to cause the FCS to provide a stack power commensurate with the stack power request; and
wherein the controller is further configured to, upon the stack voltage meeting or exceeding the predetermined threshold, increase the stack power request to an increased stack power request and adjust the stack current to an increased desired amount corresponding to the increased stack power request to cause the FCS to provide an increased stack power commensurate with the increased stack power request with the stack voltage, which inversely depends on the stack current, being decreased to be less than the predetermined threshold due to the stack current being increased to the increased desired amount, and the stack voltage being maintained to be less than the predetermined threshold due to the stack current being at the increased desired amount as the stack voltage inversely depends on the stack current.

8. The vehicle of claim 7 wherein:
the FCS includes a fuel cell stack comprised of a number of fuel cells connected in series, the stack voltage is a summation of voltages of the fuel cells, and a maximum cell voltage is either the largest voltage of the voltages of the fuel cells or the stack voltage divided by the number of fuel cells; and
the stack voltage is considered to be less than, meet, or exceed the predetermined threshold upon the maximum cell voltage being less than, meeting, or exceeding, respectively, a predetermined maximum voltage.

9. The vehicle of claim 8 wherein:
the voltages of the fuel cells are decreased less than the predetermined maximum voltage while the stack voltage is maintained to be less than the predetermined threshold.

10. The vehicle of claim 8 wherein:
the controller is further configured to, upon a stack power commensurate with a stack power request being lower than a calculated minimum power, increase the stack power request to the increased stack power request and adjust the stack current to the increased desired amount corresponding to the increased stack power request to cause the FCS to provide the increased stack power commensurate with the increased stack power request.

11. The vehicle of claim 10 wherein:

the controller is further configured to set the calculated minimum power dependent on an operating condition of the FCS.

12. The vehicle of claim 7 further comprising:

a traction battery configured to provide a battery power for vehicle propulsion.

* * * * *